United States Patent [19]
Duquenne

[11] 3,931,976
[45] Jan. 13, 1976

[54] MAGNETICALLY CONTROLLED OBTURATOR

[75] Inventor: Claude Duquenne, La Garenne, France

[73] Assignee: Societe Nationale d'Etude et de Construction de Moteurs d'Aviation, Paris, France

[22] Filed: Oct. 15, 1974

[21] Appl. No.: 514,996

[30] Foreign Application Priority Data
Oct. 19, 1973 France.............................. 73.37308

[52] U.S. Cl. .............................................. 277/80
[51] Int. Cl.² ........................................... F16J 9/00
[58] Field of Search....................... 277/80; 415/111

[56] References Cited
UNITED STATES PATENTS

| | | | |
|---|---|---|---|
| 3,025,070 | 3/1962 | Copes............................ | 277/80 X |
| 3,137,237 | 6/1964 | Zagar et al...................... | 277/80 X |
| 3,283,865 | 11/1966 | Mason............................ | 277/80 X |
| 3,460,844 | 8/1969 | Whittle........................... | 277/80 X |

Primary Examiner—Samuel B. Rothberg
Attorney, Agent, or Firm—Cameron, Kerkam, Sutton, Stowell & Stowell

[57] ABSTRACT

An obturator for the rotor of a machine such as a compressor for special or toxic fluids consists of an annular seal clamped in the active position between stationary knife-edge elements provided on the rotor and movable knife-edge elements carried by an annular supporting member which is capable of moving along the axis of the machine under the action of magnetic means between an inactive position at a distance from the rotor and an active position in which the supporting member is coupled with the rotor as a result of magnetic attraction forces. The movable knife-edge elements are joined to the movable supporting member by resilient means whereby an obturation force of lower value than the magnetic attraction force is exerted in the direction of the stationary knife-edge elements.

7 Claims, 6 Drawing Figures

MAGNETICALLY CONTROLLED OBTURATOR

This invention relates to an obturator for achieving leak-tightness between a driving unit and a receiving unit associated by disconnectable coupling means and applies more especially when the receiving unit is the rotor of a compressor for special gases, especially for toxic or hazardous gases.

The primary aim of the invention is to permit uncoupling of the driving unit from the rotor while maintaining leak-tightness between this latter and the surrounding medium for such purposes as overhaul, maintenance or repair of said driving unit, which avoids the need to drain or purge the compressor, the internal space of which can therefore remain occupied by the toxic or hazardous gas.

In rotating machines of this type, it is already a known practice to make use of obturators of the type consisting of an annular seal located in a plane at right angles to the axis of rotation of the compressor, said seal being clamped in the active position between on the one hand stationary knife-edge elements formed for this purpose on the rotor and on the other hand movable knife-edge elements carried by a movable support which is capable of moving along the axis of the machine under the action of control means between the active position in which said support is urged towards the rotor and an active position in which said support is held at a distance from this latter.

In obturators of this type, the obturation force is usually obtained as a result of the action of a spring which cooperates with a mechanism for releasing or compressing said spring. This mechanism which additionally performs the functions of locking and releasing is usually controlled by means which utilize a hydraulic pressure. In installations of this type, the obturation force is exerted between the rotor and the casing of the machine; especially in the case of machines having a vertical axis which are the most commonly employed, this obturation force is consequently a function of the weight of the rotor. This weight may accordingly vary to a considerable extent, depending on whether the pivot system is in position or not. Moreover, when the size of the machine to be equipped becomes relatively large, the weight of the pivot system and of the electric motor which is often associated with this latter becomes such that it proves difficult in practice to displace and maintain the machine as a whole.

This invention relates to an obturator of more simple design than those which have been known up to the present time and in which the obturation force can be determined with precision.

To this end, the obturator according to the present invention in which the movable supporting member is capable of displacement under the action of magnetic means between an inactive position in which said member is held at a distance from the rotor and an active position in which said member is coupled with said rotor by means of magnetic attraction forces, is characterized in that the movable knife-edge elements are connected to the movable support member by resilient means whereby an obturation force of lower value than the magnetic attraction force is exerted in the direction of the stationary knife-edge elements.

In a preferred arrangement of the invention, the magnetic means for displacing the movable supporting member are constituted by at least one pair of electromagnets having parallel cores formed of permanent magnet material by means of mild steel armatures, the coils mounted on said cores being supplied with currents such as to produce within said coils fluxes which are added so as to obtain according to the direction of said fluxes an attractive force which is respectively positive or zero.

In accordance with another arrangement of the invention, the resilient means which connect the movable knife-edge elements to the movable supporting member are constituted by at least one resilient washer which is applied along the internal diameter thereof against the movable supporting member and along the external diameter thereof against the movable knife-edge elements while exerting on said elements a force which is directed towards the annular seal.

The obturator in accordance with the invention thus achieves a combination of three distinct elements which cooperate in their different functions, and especially an annular seal which constitutes a packing gland, a magnetic control system for carrying out the displacement of a movable supporting member and resilient means which ensure a flexible connection between the movable knife-edge elements which are intended to be applied against the seal and the supporting member so as to produce a predetermined general obturation force which is independent of any possible variations in air-gap in the magnetic control system of the movable supporting member.

Further characteristic features of the obturator under consideration will become apparent from the following description of a number of examples of construction which are given by way of indication without any implied limitation, reference being made to the accompanying drawings, wherein.

Figure 1:
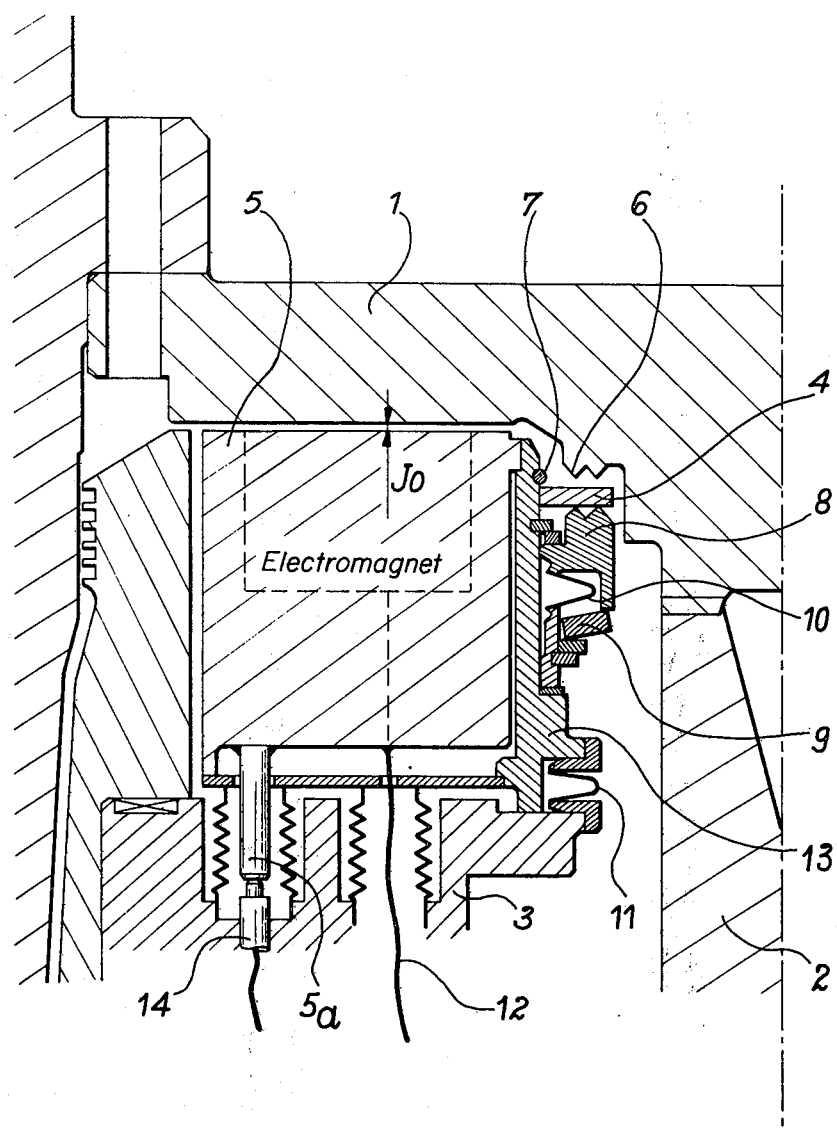
FIG. 1 is a sectional view of an obturator in accordance with the present invention as shown in the inactive position thereof.
Figure 2:
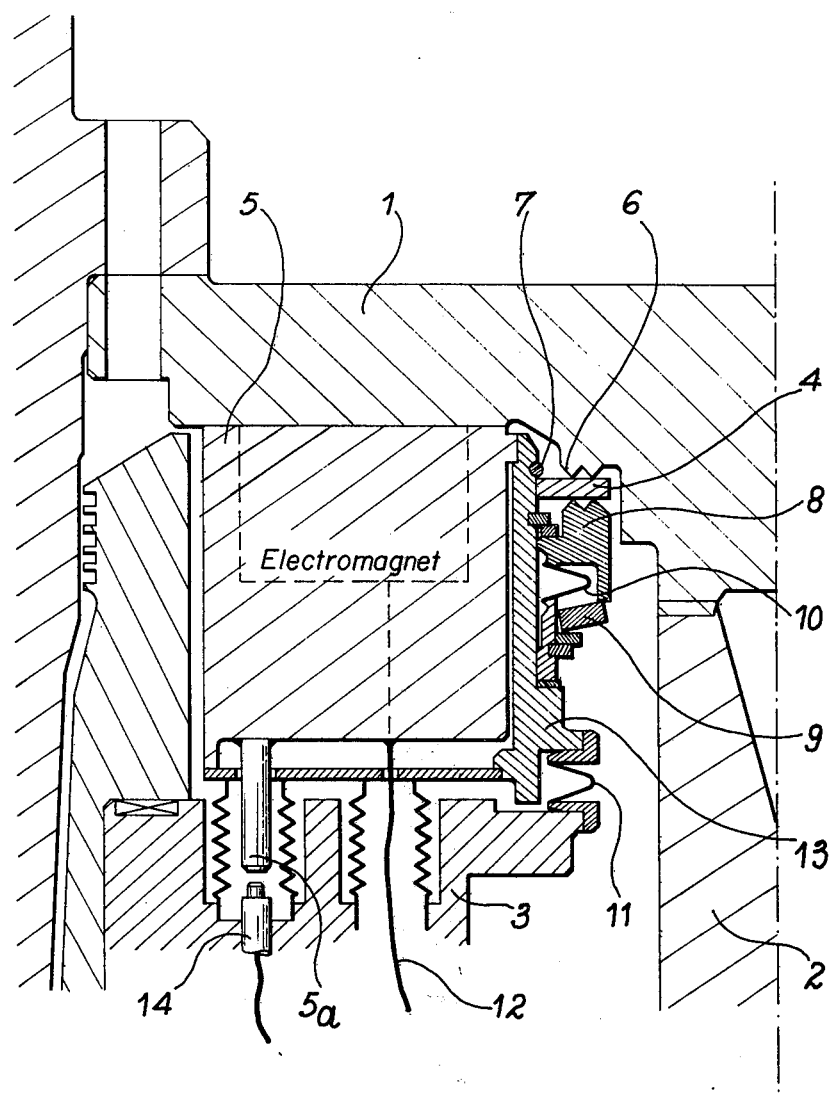
FIG. 2 shows the same obturator as in FIG. 1 but in the active position thereof.

In FIGS. 1 and 2, there is shown in cross-section an obturator which is mounted between a driving motor and the rotor of a compressor for toxic or hazardous gases, said driving motor being connected to the compressor by separable coupling means which are not shown in the drawings.

In the arrangement illustrated, the hub 1 of the compressor rotor is driven in rotation by a shaft 2. The obturator in accordance with the invention is intended to ensure leak-tightness between the hub 1 and the casing 3 of said compressor.

The obturator comprises an annular seal 4 located in a plane at right angles to the axis of rotation of the compressor rotor 1, said annular seal 4 being carried by a movable annular supporting member 5 which is capable of axial displacement under the action of magnetic control means between an active position in which said seal is urged towards stationary knife-edge elements 6 which are integral with the hub 1 of the rotor and an inactive position in which said seal is maintained at a distance from said knife-edge elements 6.

In the example under consideration, the annular seal 4 is held against the movable supporting member, on the one hand by means of a retainer-ring 7 and on the other hand by means of movable knife-edge elements 8, said elements being in turn connected to the movable supporting member by means of a resilient washer 9. Said washer is applied along the internal diameter thereof against the movable supporting member and along the external diameter thereof against the movable knife-edge elements while exerting on these latter a force which is directed towards the annular seal.

A bellows element 10 joins the movable knife-edge elements 8 to the movable supporting member 5 in leak-tight manner. Similarly, a bellows element 11 joins the movable supporting member 5 to the compressor casing 3 in leak-tight manner.

The magnetic means which are intended to produce an attractive force between the hub 1 of the rotor and the movable supporting member 5 are placed within the interior of this latter and supplied with electric current through a cable 12. The armatures of the magnetic circuit are mounted flush with the surface of the movable supporting member 5 opposite to the hub 1 of the rotor.

In the inactive position, the movable supporting member 5 is carried on the casing 3 by means of an abutment member 13 which defines an air-gap value Jo between the top face of the movable supporting member 5 and the opposite face of the rotor hub 1.

Checking of the state of the obturator is carried out by means of a position indicator 14 which detects the changeover to the inactive position. This position indicator is constituted by an electric contact placed between a stud 5a which is rigidly fixed to the movable supporting member 5 and the compressor casing 3.

When an attractive force is exerted between the hub 1 of the rotor and the movable supporting member 5, said supporting member moves away from the position in which it is supported on the casing 3 by the abutment member 13. By means of its top face, the movable supporting member 5 is then in contact with the hub 1 of the rotor and is thus coupled thereto, the air-gap Jo being practically reduced to a zero value.

In this new position which corresponds to the configuration of FIG. 2, the annular seal 4 is accordingly clamped between on the one hand the stationary knife-edge elements 6 and on the other hand the movable knife-edge elements 8; the obturator seals-off the casing, with the result that the driving motor and its pivot system can accordingly be removed.

The obturation force is developed by the resilient washer 9. Said washer is chosen so as to ensure that, in respect of a deformation of said washer in compression corresponding to the distance of travel of the movable supporting member and taking into account the compression or degree of flattening proper of the annular seal, the resultant force obtained is satisfactory for the conditions of use of the machine, or in other words so as to ensure that any outleakage of toxic gas from the casing is strickly prohibited.

Figure 3:
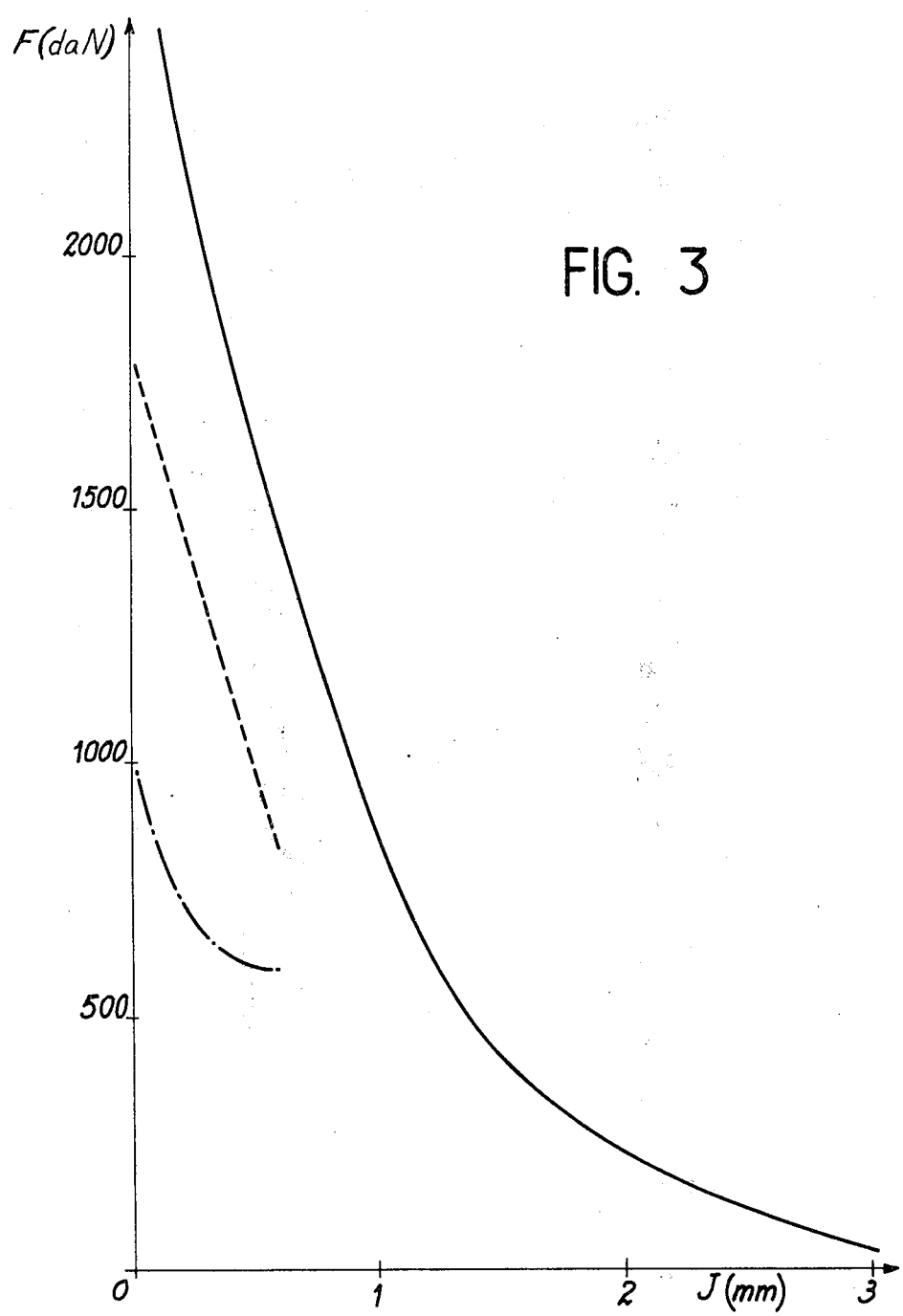
FIG. 3 shows in the form of a diagram the forces which are developed in the obturator according to the invention.

The forces developed within the obturator in accordance with the invention are represented by the diagram of FIG. 3 in which the forces expressed in daN (decanewtons) are plotted as ordinates and the clearance between the movable member 5 of the rotor hub 1 as expressed in millimeters are plotted as abscissae.

Again in FIG. 3, the full-line curve represents the attractive force which is exerted between the movable supporting member 5 and the rotor hub 1. This force is the resultant of the magnetic force and of the weight of the movable supporting member, and is of opposite direction. The dashed curve represents the obturation force developed by the resilient washer 9. The chain-dotted curve represents the resultant of the attractive force and of the obturation force which is chosen as indicated in the foregoing.

As shown in these diagrams, the force developed by the resilient washer 9 is always lower in value than the attractive force which applies the movable supporting member 5 against the rotor hub 1; the resultant force is therefore always in the direction which applies the seal 4 against the stationary knife-edge elements, thus continuously ensuring the requisite degree of leak-tightness.

The obturation force is clearly regulated as a function of the diameter of the knife-edge elements, the profile of said elements, the nature of the material constituting the annular seal 4 and so forth. The deflection or deformation by compression which is imposed on the resilient washer 9 substantially compensates for the relaxation resulting from penetration of the knife-edge elements into the annular seal. All things considered, the characteristics of the washer are so defined that the deflection applied in the open position of the obturator is lower in value than the attractive force when the air-gap is such that the clearance between the annular seal and the knife-edge elements has been reduced to zero.

Figure 4:
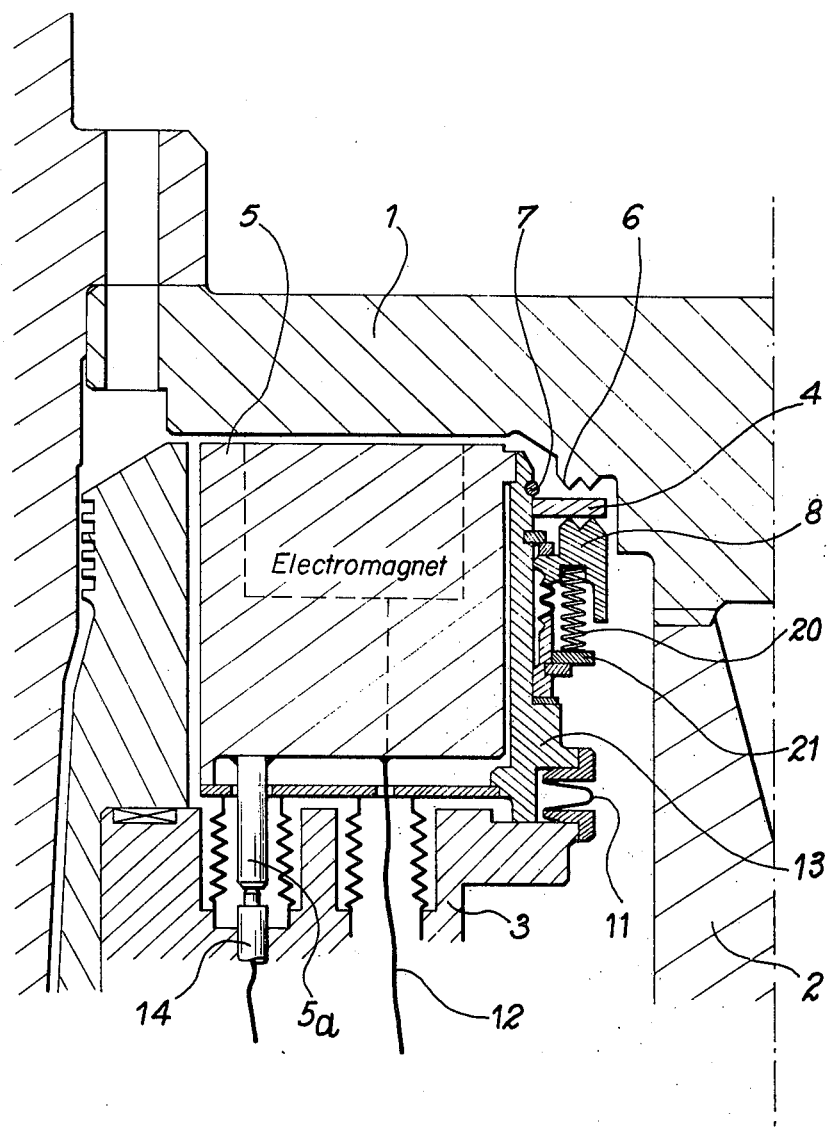
FIG. 4 illustrates an alternative form of construction of the resilient means of the obturator.

In another embodiment which is illustrated in FIG. 4, the resilient washer 9 could be replaced by helical springs such as the spring 20 which are arranged cylindrically in the shape of a drum around the movable supporting member 5. The extremities of said helical springs are accordingly applied against stops 21 formed for this purpose on the movable supporting member 5 and against the movable knife-edge elements 8.

Figure 5:
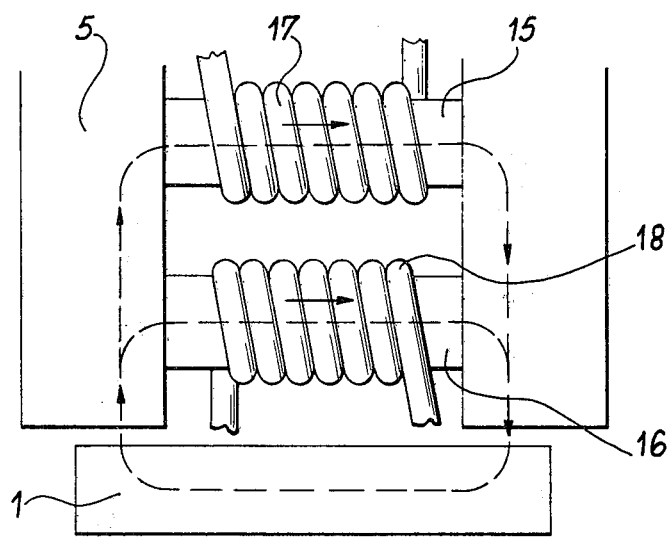
FIGS. 5 and 6 show diagrammatically one form of construction of the magnetic means employed in an obturator according to the invention.
Figure 6:
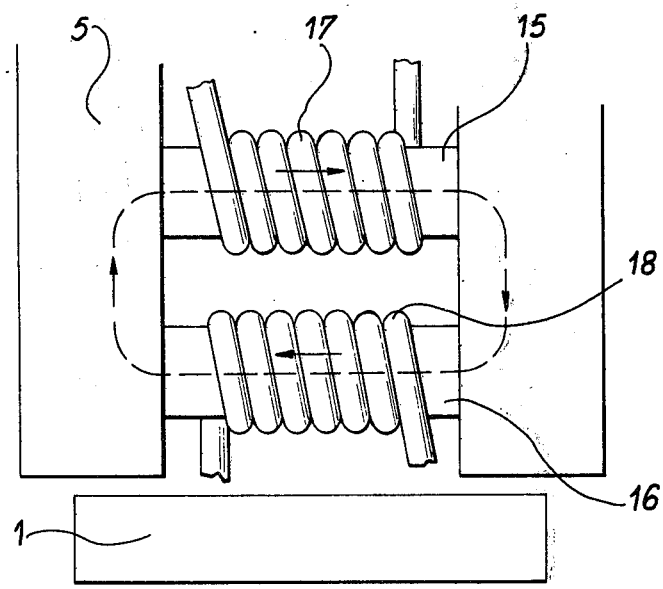

The magnetic attraction means which are advantageously employed in the obturator under consideration are shown diagrammatically in FIGS. 5 and 6. Said magnetic attraction means are preferably constituted by at least one pair of electromagnets in which the parallel cores 15 and 16 are formed of permanent-magnet material and in which the coils 17 and 18 mounted on said cores are supplied separately.

In accordance with the arrangement shown in FIG. 5, suitable current pulses within the coils 17 and 18 produce permanent fluxes having the saame direction within cores 15 and 16. As a result, said fluxes are added and the lines of force are closed by the mild steel magnetic circuit constituted by armatures placed within the interior of the movable supporting member 5 and by the rotor hub 1, thus exerting an attractive force between this latter and said movable supporting member 5.

In accordance with the arrangement shown in FIG. 6, the current pulses within the coils 17 and 18 produce within the cores 15 and 16 fluxes of opposite direction which are reduced to zero. No further line of force passes through the rotor hub 1 and the air-gap which is provided between this latter and the supporting member 5, with the result that there is no longer any force of magnetic attraction.

Solely as a result of the action of short pulses within the coils 17 and 18, an arrangement as described in the foregoing makes it possible to reduce a permanent attractive force or to reduce said force to zero.

It is apparent that a mechanism of this type can advantageously perform the driving functions of the obturator since it does not entail the continuous supply of the winding and constitutes a bistable mechanism which dispenses with the need of a device for locking in either of the active or inactive positions which are contemplated.

Moreover, in a preferential mode of execution of the invention, the portion of the magnetic armature which is external to the movable supporting member 5 is secured to the rotor hub 1 or is constituted in the more general case by an element which forms part of said hub. Thus the forces utilized at the time of the operation involving closure of the obturator are applied to the loop constituted by the rotor and the movable supporting member and do not need to be sustained by a movable abutment member which is rigidly fixed to the rotor. The technology and construction of the machine are accordingly simplified and operational safety is enhanced since the axial clearance which exists at the level of said abutment member is always small.

At the time of closure of the obturator, the movable supporting member 5 is applied against the rotor hub 1 with zero air-gap. Thus the relative positions of the two components is perfectly defined and does not depend on an unstable equilibrium which would result from another mode of operation of the type in which provision is made for closure with a non-zero air-gap.

Furthermore, since no effort is applied to the casing, the operation is not affected by the relative positioning of the rotor with respect to said casing.

What we claim is:

1. An obturator for the rotor of a rotating machine which conveys a noxious fluid, said obturator being constituted by an annular seal located in a plane at right angles to the axis of rotation of the machine, said seal being clamped in the active position between on the one hand stationary knife-edge elements provided for this purpose on the rotor and on the other hand movable knife-edge elements carried by an annular supporting member which is capable of moving along the axis of the machine under the action of magnetic means between an active position in which said supporting member is held at a distance from the rotor and an active position in which said member is coupled with said rotor by means of magnetic attraction forces, wherein the movable knife-edge elements are connected to the movable support member by resilient means whereby an obturation force of lower value than the magnetic attraction force is exerted in the direction of the stationary knife-edge elements.

2. An obturator according to claim 1, wherein the magnetic means for displacing the movable supporting member are constituted by at least one pair of electromagnets having parallel cores formed of permanent magnet material and joined together by means of mild steel armatures, the coils mounted on said cores being supplied with currents such as to produce within said coils fluxes which are added so as to obtain according to the direction of said fluxes an attractive force which is respectively positive or zero.

3. An obturator according to claim 2, wherein the magnetic means for displacing the movable supporting member are placed within said member, the mild steel armatures of the magnetic circuit being mounted flush with the surface which is in contact with the rotor in the active position.

4. An obturator according to claim 1 wherein the resilient means which connect the movable knife-edge elements to the movable supporting member are constituted by at least one resilient washer which is applied along the internal diameter thereof against the movable supporting member and along the external diameter thereof against the movable knife-edge elements while exerting on said elements a force which is directed towards the annular seal.

5. An obturator according to claim 1 wherein the resilient means which connect the movable knife-edge elements to the movable supporting member are constituted by helical springs arranged cylindrically in the shape of a drum around said movable supporting member, said springs being each applied at one end against said movable supporting member and at the other end against said movable knife-edge elements.

6. An obturator according to claim 1 wherein leak-tightness between the movable knife-edge elements and the movable supporting member is ensured by means of a bellows element.

7. An obturator according to claim 1 wherein leak-tightness between the movable supporting member and the fixed casing of the machine is ensured by means of a bellows element.

* * * * *